United States Patent Office 3,461,286
Patented Aug. 12, 1969

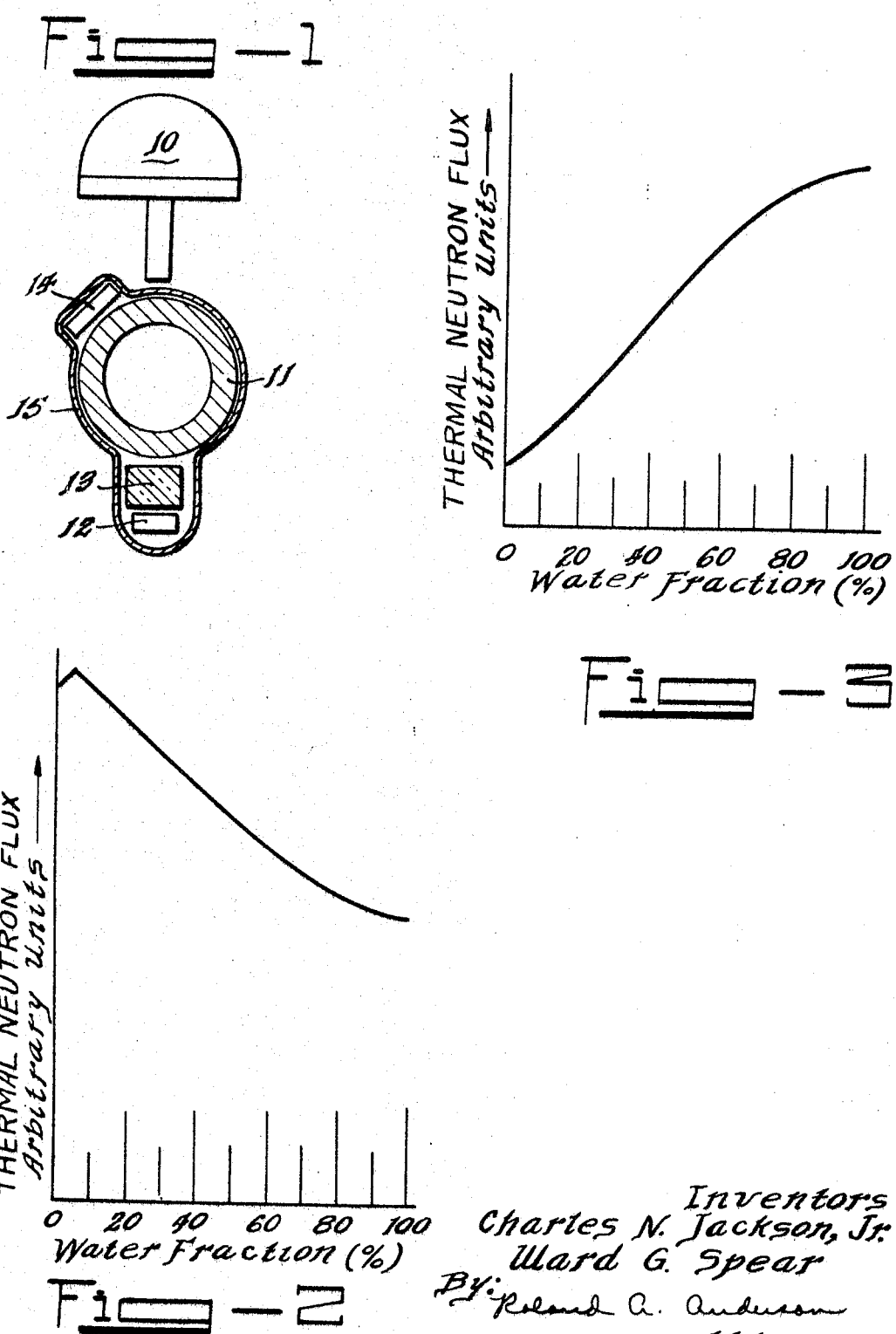

3,461,286
METHOD AND APPARATUS FOR MEASURING THE VOID FRACTION OF HYDROGENOUS FLUIDS
Charles N. Jackson, Jr., and Ward G. Spear, Richland, Wash., assignors to the United States of America as represented by the United States Atomic Energy Commission
Filed May 23, 1968, Ser. No. 731,521
Int. Cl. G01n 23/12
U.S. Cl. 250—43.5               3 Claims

ABSTRACT OF THE DISCLOSURE

Method and apparatus for measuring the void fraction of hydrogenous fluids such as boiling water using absorption and moderation effects of the mixture. A high-intensity beam of fast neutrons is directed through the hydrogenous fluid and the intensity of the thermal neutrons obtained by scattering from said hydrogenous fluid or by moderating fast neutrons passing completely through the fluid is measured.

CONTRACTUAL ORIGIN OF THE INVENTION

The invention described herein was made in the course or, or under, a contract with the United States Atomic Energy Commission.

BACKGROUND OF THE INVENTION

This invention relates to the measurement of two-phase flow of rapidly flowing hydrogenous material. In more detail, the invention relates to the measurement of the void fraction in a steam-water mixture flowing rapidly through a relatively large-diameter, thick-walled pipe.

Precise knowledge of the proportion of voids to fluid in a hydrogenous mixture would be useful in many widely different fields; for example, it is frequently desirable to know the quality of water in a process pipe at a steam plant. In addition, in connection with safety investigations concerning the loss of nuclear reactor liquid coolants as the result of an accident, it is essential that the investigator be able to determine accurately the characteristics of mixtures of steam and water flowing through a large, thick-walled pipe. The characteristics required include not only the overall proportion of steam to water in the pipe but also the distribution of steam; that is, whether the steam is evenly distributed through the pipe or is concentrated in part of the pipe.

There are several techniques which could be used to obtain this information. Some of these techniques are described in Patent No. 3,350,564, issued Oct. 31, 1967, to C. F. Borilla et al., which patent also describes and claims a technique involving neutron attenuation. According to this patent, a low-energy, low-intensity neutron source is encapsulated and introduced into the channel being tested. A small quantity of boron is dissolved in the water in the channel and a thermal neutron detector placed outside the channel. The higher the proportion of water present in the channel the more boron there is in the channel and the more neutrons will be captured before reaching the neutron detector. Thus the detector gives an indication which is directly proportional to the proportion of steam to water in the channel. While reasonably satisfactory results have been attained using the technique described in the patent, obviously insertion of the encapsulated neutron source in the channel and addition of boron to the water in the channel would, in many situations, be undesirable. In addition, applicability of the technique is limited, since the intensity of the neutron source is relatively low.

A technique mentioned in the patent and described in more detail in the American Institute of Chemical Engineers Journal, volume 11, No. 5, pages 794–800, employs X-ray attenuation. As is pointed out in the patent, the attenuation coefficient of X-rays that can penetrate steel walls is so low in water that accuracy is poor. For pipes of the size and wall diameter employed in this investigation, it is not possible to obtain meaningful results using X-rays.

It is accordingly an object of the present invention to provide a sensitive method of measuring the void fraction in hydrogenous fluids of wide versatility.

It is a more detailed object of the present invention to provide a method of measuring the proportion of steam to water in a mixture thereof flowing through a thick-walled pipe.

It is another object of the present invention to provide an apparatus for measuring the void fraction of hydrogenous fluid flowing through a thick-walled pipe.

SUMMARY OF THE INVENTION

These and other objects of the present invention are attained by directing an intense beam of high-energy neutrons through the liquid-vapor mixture being investigated, moderating the fast neutrons which pass completely through the mixture, and measuring the intensity of the resulting thermal neutrons, and also measuring the intensity of thermal neutrons departing the pipe at an acute angle to the direction of the beam of incident neutrons. Thus the technique requires use of an intense beam of high-energy neutrons and commercial neutron generators are available for this purpose.

BRIEF DESCRIPTION OF THE DRAWING

The invention will next be described in connection with the ccompanying drawing wherein:

FIG. 1 is a sketch illustrating the arrangement of apparatus designed to carry out the method of the present invention, FIG. 2 is a graph showing the results of experiments using a proportional counter located diametrically opposite the beam of incident neutrons, and FIG. 3 is a graph showing the results of experiments using a proportional counter located at an angle of 45° to the beam of incident neutrons.

Referring now to FIG. 1, a neutron generator 10 is positioned adjacent to an external surface of a thick-walled pipe 11 so as to direct a beam of neutrons of high energy in a radial direction through said pipe and into a hydrogenous fluid flowing through the pipe. A boron-lined proportional counter 12 is disposed adjacent an external surface of pipe 11 diametrically opposite neutron generator 10 and in line with the beam of neutrons from said generator and a layer 13 of neutron-moderating material is interposed between pipe 11 and proportional counter 12. An additional boron-lined proportional counter 14 is disposed adjacent an external surface of pipe 11 at an acute angle to the angle of incidence of the neutron beam. This angle may be, for example, 45° as shown in the drawing. A cadmium sheet 15 (0.020 inch thick) circumferentially encompasses pipe 11, layer 13 and proportional counters 12 and 14 to prevent stray neutrons from striking the thermal neutron detectors.

In operation, a hydrogenous fluid, such as boiling water, is passed through pipe 11. A beam of fast neutrons from generator 10 is directed into the hydrogenous fluid in pipe 11. The fast neutron beam is attenuated by scattering from the hydrogen atoms in the fluid and a portion of the neutrons are absorbed in the fluid present in the pipe. The number of fast neutrons passing completely through pipe 11, and therefore the number of thermal neutrons detected by proportional counter 12 is inversely proportional to the proportion of fluid to void in the pipe. If the fluid is a gas, of course, the indication is of the density of the gas; if the fluid is a liquid, such as boiling water, the indication is of the proportion of bubbles to liquid. In addition, it is evident that the intensity of thermal neutrons incident upon counter 14 is directly proportional to the proportion of fluid to void in the pipe, since it is only neutrons which have been scattered by the hydrogen atoms in the fluid that will be detected by counter 14.

To calibrate the system, a series of tests was run against standards. To accomplish this, an insert containing 80 small tubes was placed in pipe 11 and varying numbers of these tubes were filled with water. The curve of FIG. 2 was obtained using proportional counter 12 and the curve of FIG. 3 was obtained using proportional counter 14.

The results of initial measurements employing proportional counter 12 are given in the following table.

BLOWDOWN CONDITIONS AND INITIAL QUALITY DETERMINATIONS

| Run | Pressure (p.s.i.g.) | Temp. (° F.) | Diameter orifice (in.) | Duration (sec.) | Quality |
|---|---|---|---|---|---|
| B-13 | 1,550 | 615 | 8 | 4.2 | 0.06-0.4 |
| B-12B | 1,550 | 595 | 4 | 18 | 0.017-0.7 |
| B-11 | 1,250 | 575 | 4 | 20 | 0.007-0.18 |
| B-10 | 1,250 | 575 | 2 | 66 | 0.0024-0.25 |

These experiments were performed by heating water in a tank to the temperature and at the pressure given in the table, blowing out a rupture disk of the size given with flow of water-steam lasting the length of time given and employing the method of this invention to determine the quality of the water, the quality being given by the equation $$\text{Quality} = \frac{\alpha}{\alpha + (1-\alpha)\frac{V_g}{V_l}}$$

where $\alpha$ is the void fraction, $V_g$ is the specific volume of the gas and $V_l$ is the specific volume of the liquid.

These tests show that water quality increases with increasing orifice size as expected and, also as expected, the higher temperature test exhibited higher quality.

In carrying out this invention, it is necessary to employ a source of high-energy neutrons of sufficient intensity to drive fast neutrons completely across the pipe 11, since it is in terms of variation in this number that an indication is obtained. For this purpose, a commercial neutron generator comprising a Cockroft-Walton accelerator directing charged particles onto a tritium target and producing 14 mev. neutrons at a rate of up to $10^{11}$ neutrons/second is satisfactory.

In the experimental apparatus, a Lucite block 3 inches thick was used as moderator. This is not critical, however, as the only requirement is that it be thick enough to moderate all neutrons passing therethrough to thermal energies and not so thick that it will attenuate the neutrons to an unacceptable degree. Other moderator materials may also be used, water being an obvious alternative.

The neutron detection apparatus used in the tests reported herein consisted of proportional counters 12 and 14—for example, model RSN-127A made by Reuter-Stokes—and also a preamplifier, an amplifier and discriminator and a recorder, all of which are conventional.

It will be understood that the invention is not to be limited to the details given herein but that it may be modified within the scope of the appended claims.

The embodiments of the invention in which an exclusive property or privilege is claimed are defined as follows.

We claim:

1. A method for measuring the void fraction of water boiling within a large diameter, thick-walled pipe comprising directing a high-intensity beam of high-energy neutrons through the boiling water, moderating the fast neutrons which pass completely through the boiling water to thermal energies, and measuring the intensity of the thermal neutrons produced thereby.

2. A method according to claim 1 wherein the fast neutrons are produced in a neutron generator comprising a Cockroft-Walton accelerator directing charged particles onto a tritium target, and the fast neutrons passing through the boiling water are moderated to thermal energies by water or a hydrogenous plastic interposed between the pipe and a boron-lined proportional counter in line with the incident beam of high-energy neurtons.

3. Apparatus for measuring the void fraction of water boiling within a large diameter, thick-walled pipe comprising a source of fast neutrons positioned adjacent to an external surface of said pipe to direct a beam of fast neutrons in a radical direction through said pipe and into the boiling water, a detector of thermal neutrons positioned adjacent an external surface of said pipe in line with the direction of the beam, a layer of neutron-moderating material interposed between said pipe and said detector, a second neutron detector positioned adjacent to an external surface of said pipe at an acute angle with the direction of said beam, and a layer of thermal neutron absorber circumferentially encompassing said pipe and said detectors.

References Cited

UNITED STATES PATENTS

| 2,873,377 | 2/1959 | McKay | 250—43.5 |
| 3,065,346 | 11/1962 | Dewan et al. | 250—83.6 |
| 3,229,092 | 1/1966 | Eberline | 250—83.1 |
| 3,350,564 | 10/1967 | Bonilla et al. | 250—43.5 |

RALPH G. NILSON, Primary Examiner

D. L. WILLIS, Assistant Examiner

U.S. Cl. X.R.

250—83